Jan. 5, 1960 DU BOIS EASTMAN 2,920,042
METHOD FOR PREPARING WATER RESISTANT GREASE AND HYDROPHOBIC FINELY-DIVIDED SOLIDS
Filed March 28, 1955
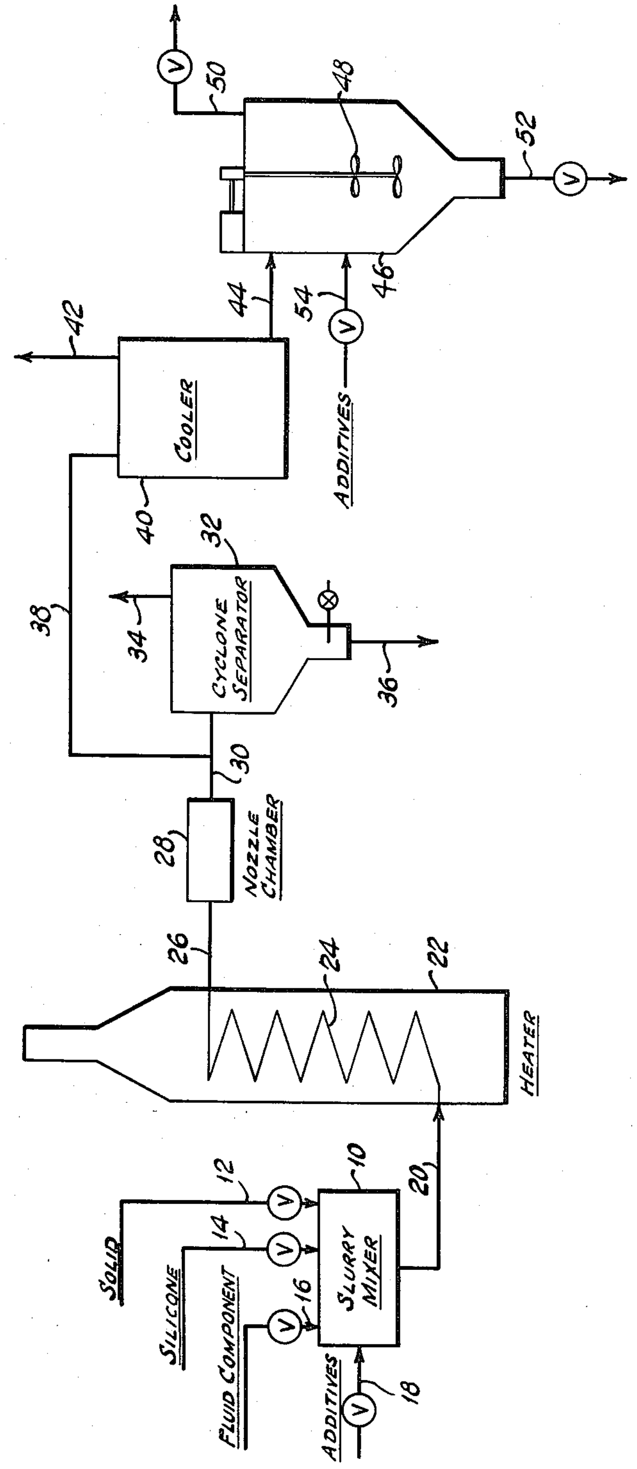

United States Patent Office 2,920,042

Patented Jan. 5, 1960

2,920,042

METHOD FOR PREPARING WATER RESISTANT GREASE AND HYDROPHOBIC FINELY-DIVIDED SOLIDS

Du Bois Eastman, Whittier, Calif., assignor to Texaco Inc., a corporation of Delaware Application March 28, 1955, Serial No. 497,012

4 Claims. (Cl. 252—28)

This invention relates to hydrophobic, finely-divided solids and a method of their manufacture. More particularly, the invention concerns a silicone-coated, finely-divided solid grease component manufactured by the addition of a silicone to a relatively coarse solid particulate material prior to being ground.

Generally speaking, the efficacy of a solid thickening agent depends a great deal on the particle size of the solid. The finer the particles the greater the thickening or gelling properties. In copending, coassigned application, Serial No. 400,266, Harry V. Rees and L. C. Kemp, filed December 4, 1953, there is shown and described a very successful method of slurry grinding relatively coarse solid particles to produce finely-divided particles having superior grease-thickening properties.

Solid particulate grease thickeners or gelling agents which are hydrophilic in nature are objectionable in that the greases in which such hydrophilic solid particles are incorporated do not have sufficient water resistance to be successfully utilized. A known method of making hydrophilic gelling agents water-resistant involves the addition of a silicone polymer to a thickened grease mixture comprising oil and a finely-divided gelling agent. Prior to this invention, the use of silicone resins for this purpose had two major drawbacks. First; silicone concentrations of as much as 10 to 100 weight percent of the dry weight of the gel were required. Secondly; dispersion of silicone on the gelling agent required milling of the solid-thickened grease mixture. Since silicones are still in the category of high priced chemicals, prior to this invention it has been impractical to use silicone-treated gelling agents for anything but high-priced specialty greases.

The process of this invention makes feasible the use of silicones to render hydrophilic gelling agents hydrophobic and provides hydrophobic gelling agents at a price which permits their use in the manufacture of large volume greases. It has been discovered that the process described in the afore-identified copending application is particularly well suited to the production of hydrophobic, finely-divided grease components.

The present invention involves a continuous method for making hydrophobic, finely-divided solids by initially mixing coarse solid particles, which are normally hydrophilic, silicone in an amount less than about 5 weight percent based on the solid component, and a liquid to form a fluid mixture such as a slurry or a gel, vaporizing the liquid component of the fluid mixture to form a dispersion of particles of solid particles in the vapor and passing this dispersion at high velocity in turbulent flow through a zone so that the coarse particles are converted to silicone-coated hydrophobic fine particles. Advantageously, the fluid mixture comprising liquid, silicone and coarse particles is vaporized in a tubular zone and passed through the tubular zone at high velocity in turbulent flow whereby they are converted to fine particles of a size suitable for grease manufacture. During the turbulent flow of the solid particles, the silicone component of the fluid mixture is excellently dispersed on the solid particles so that the resulting silicone-coated, fine particles are formed with a small initial concentration of silicone.

The process of the invention has a substantial advantage over the prior art method of forming silicone-coated solid gelling agents in that a hydrophobic product is formed with much lower concentration of silicone. Silicone concentrations of 0.5 to 5 weight percent and preferably 1 to 3 weight, basis dry weight of gelling agent are used in this invention whereas silicone concentrations of 10 to 100 weight percent were required in prior art methods. Very efficient contacting results from passage of the particles, silicone and vapor carrier through the tubular zone at high velocity in turbulent flow so that the silicone is very efficiently utilized.

An additional advantage is that the milling required in prior art procedures is not necessary. The process of the subject invention concomitantly comminutes the solid to the particle size required for their use as gelling agents and renders them water-resistant.

For illustrating the invention, two forms of the process outlined generally above will be described. In the first form, solid particles and a silicone are mixed with lubricating oil to form a slurry which is then vaporized in the tubular zone to effect the grinding. The lubricating oil vapors then are condensed to form a thickened dispersion of solid particles in oil, which may be withdrawn. If desired, a soap may be incorporated as by injecting it into the flowing dispersion of silicone and solid particles in oil vapors before the condensing step.

In a second form the solid particles or a material from which they can be derived are mixed with water or other suitable liquid to form a fluid mixture such as a gel or slurry, and a silicone in an amount less than 5 weight percent of gelling is added. The fluid mixture is vaporized and passed through a heated tubular grinding zone; the vapors are separated from the ground silicone-coated particles which thereafter are compounded with lubricating oil, with or without the addition of a soap to form a completed grease.

Silicones useful in the present invention are defined as polymeric organo-silicon oxide condensation products preferably normally liquid, of the following general formula:

$$R-\left[\begin{array}{c}R\\|\\Si-O\\|\\R\end{array}\right]_n-\begin{array}{c}R\\|\\Si-R\\|\\R\end{array}$$

wherein R represents similar or dissimilar organic radicals such as alkyl, aryl, alkaryl, aralkyl and heterocyclic groups; the terminal R's or other R's may be substituted by hydroxyl groups; and *n* is one or more. Such compounds and their methods of preparation to form compounds of different viscosities are well known in the art. When R in the foregoing formula is an aromatic hydrocarbon group, nuclear substituents such as a halogen, nitrogen-containing radical such as $NO_3$ or $NH_2$, a sulfur-containing radical such as $SO_3H$ or SH, or the thio derivatives thereof may occur.

Typical polymerized compounds include dimethyl silicone, methyl phenyl silicone, ethyl butyl silicone, methyl cyclohexyl silicone, dicyclohexyl silicone, diphenyl silicone, hydroxy phenyl methyl silicone, phenyl propyl silicone, phenyl isopropyl silicone, tolyl butyl silicone, tolyl amyl silicone and phenyl hydroxy ethyl silicone. Compounds containing simple organic radicals such as methyl, ethyl and short chain alkyl groups are preferred. Such compounds may have hydroxyl groups or organic radicals as terminals.

The solid thickeners applicable to the present invention are graphite, coal, limestone, oyster shells, siliceous material such as silica gel, silica, diatomaceous earth, clays and glasses and other hydrophilic solids. The term silica, as used herein, is not to be limited to silica gel which is a specific type of silica material. Generally speaking, these preferred solids are excellent grease thickeners except for their inherent hydrophilic qualities. My invention renders these solids hydrophobic as well as finely ground, thereby obviating their objectionable characteristics.

The principles of the invention will be described more in detail below with reference to the drawing wherein the accompanying figure is a schematic flow diagram showing an arrangement for manufacturing a hydrophobic, finely-divided solid or in the alternative a water-resistant grease. By reference to the drawing, it is seen that slurry mixer 10 has supply conduits 12, 14, 16 and 18 leading therein. Conduits 12 and 14 supply the solid material and silicone respectively, while conduit 16 may be used to supply a suitable lubricating oil, water, a water and oil mixture or other vaporizable liquid, depending upon what end product is desired. The function of conduit 18 will be explained later. In the slurry mixer the silicone and solid material are thoroughly dispersed in the liquid medium.

The slurry is caused to flow at high velocity through conduit 20 by pump or vacuum means into a heater 22 which has lengthy coil of tubing 24 situated therein. The slurry then proceeds through the coiled tubing 24 whereupon it is heated to the desired temperature. It is obvious that a plurality of these heater units could be used in order to obtain any desired temperature. The liquid part of the slurry, other than the silicone, is brought to a vaporous or partially vaporous state by the heater 22 having the silicone and solid particles dispersed therein. This vaporous dispersion is then conducted by means of conduit 26 to a nozzle arrangement 28, wherein the vaporous dispersion is caused to flow at a higher velocity and further turbulence in the stream of solid particles is created. Nozzle 28 is not essential to the present invention, however, it does act to reduce the time necessary for completion of the run and some form of nozzle to speed the flow is preferred. Turbulence, created by the pumping and heating of the fluid and the flow of this fluid through a zone of partial confinement such as the coil tube 24 and conduit 26, causes a good deal of grinding of the solid material thereby creating small particles sizes.

From either conduit 26 or nozzle section 28, if such is used, the vaporous dispersion is passed to cyclone separator 32 by means of conduit 30 wherein the vaporous constituent of the dispersion is separated from the solid particles and is removed by way of outlet 34. The silicone-coated, finely-divided solid is recovered from the bottom of the separator 32 through conduit 36. This hydrophobic, finely-divided solid is now ready to be mixed with a lubricating oil thereby producing a superior water-resistant grease. The cyclone separator 32 is employed in the second modification of the invention wherein a lubricating oil is not used as a fluid medium of the slurry mixture.

When a water and oil mixture or lubricating oil mixture alone is used as the liquid portion of the slurry, which is the first form of the invention, the vaporous dispersion is caused to bypass the cyclone separator by means of conduit 38 and it is passed to cooler 40 wherein a cooling medium such as water is circulated in heat exchange relationship therewith. In the cooler 40 the temperature of the vaporous dispersion is reduced sufficiently to condense the oil vapor while any uncondensable gas such as steam which may be present is maintained in the vapor state and allowed to pass from the cooler through outlet 42. The finely-divided particles are trapped in the condensed oil medium to give an oil suspension thereof. From cooler 40 the liquefied suspension of oil and silicone-coated fine particles flows through conduit 44 into a collecting hopper 46 wherein it is agitated continuously by a motor-driven stirrer 48 to assure separation of any steam bubbles therefrom, the steam passing off by way of conduit 50 at the top of the hopper. The liquid product is withdrawn from the bottom of the hopper 46 through a valve controlled outlet 52. The product obtained from hopper 46 is a grease having a consistency depending on the specific gelling action of the solid particles. Soap is used to supplement this gelling action whenever required. Soap may be injected at any place in the system between the mixer 10 and the outlet 52.

Additives such as oxidation inhibitors, etc. are introduced into the slurry mixer 10 through conduit 18 or the hopper 46 through conduit 54, depending on the heat stability of the particular additive. Typical oxidation inhibitors such as phenyl-alpha-naphthylamine and diphenyl amine can be used.

The following specific examples illustrate how the form of invention described in connection with the accompanying figure can be applied to prepare a specific hydrophobic, finely-divided solid which is thereafter compounded into a grease.

*Example 1*

A slurry consisting of 15.84 weight percent of silica gel, 1.75 percent dimethyl silicone based on the dry weight of the gel, and water was continuously prepared in the slurry mixer. 1344 pounds per hour of this slurry was first pumped through 5 heaters each having 220 feet of ½ inch tubing arranged in a coil within them. These heaters brought the slurry to about 700° causing the water to varopize and the silica and silicone to be dispersed in the vapor. This vaporous dispersion was moved through the heating coils and then forced through a nozzle having an initial orifice of ¼ inch and widening at an angle of 7° to an opening of approximately ½ inch diameter whereupon the vaporous dispersion passed into a cone-shaped member having an initial diameter of ½ inch and which opened outwardly at an angle of 7° to an opening having a diameter of 2½ inches. This cone was connected to a 5 inch length of 2½ inch tubing which was in turn connected to a 4 inch tubing having a length of 55 inches. The vaporous dispersion passed through this system and the solid particles dispersed therein were continuously reduced in size. The 55 inch long tube directed the dispersion into a cyclone separator having a 24 inch diameter from which the reduced silica particles coated with a silicone were recovered.

The recovered silicone-coated silica was then mixed with 300 Pale Oil producing a grease with a weight composition of 15 percent silica and 85 percent oil. The superiority of this grease was shown by the results obtained by a dynamic water-resistance test in which the grease prepared from silicone-coated silica made by the process of the invention had a percentage loss of only 2.5 as compared to 100 percent loss for a grease having a 15 weight percent of oleic acid-treated silica incorporated therewith.

*Example 2*

A slurry consisting of 42 weight percent of hard Georgia kaolin clay having an average particle size of 5.6 microns, 1 percent of dicyclohexyl silicone based on the weight of the dry clay, and water is mixed in the slurry mixer and passed at a rate of 1436 pounds per hour through the system as shown in the accompanying drawing and described in Example 1. The slurry is brought to a temperature of 722° F. thereby causing a dispersion of the clay and silicone in the steam. This vaporous dispersion is passed from the heating coils and caused to flow in two streams through tubes having an internal diameter of ¾ of an inch. The two streams of the vaporous dispersion are then caused to converge and flow in opposed or countercurrent relationship at a relatively high velocity of flow by means of nozzles at the ends of the opposed ¾ inch tubes. These nozzles are of ¼ inch diameter and 1⅜ inches in length. This turbulent dispersion then flows through a conduit having an internal diameter of 1 inch and a length of 25 inches to a cyclone separator having a 24 inch diameter from which the finely-divided solid clay particles ranging from 0.3 to 2 microns in size, coated with a silicone, are recovered. The recovered silicone-coated clay particles are then mixed with 300 Pale Oil producing a grease with a weight composition of 25 percent clay and 75 percent oil. The resulting grease shows a marked superiority to greases prepared with untreated kaolin grease in the dynamic water resistance test.

The following specific examples illustrate how the invention described in connection with the accompanying figure can be applied to prepare a specific water resistant grease composition.

*Example 3*

A slurry composed of about 40 percent by weight of silica gel particles (containing 60 percent water by weight) 2 to 4 mesh in size (U.S. standard), 3 percent diphenyl silicone, based on dry weight of the silica gel, and about 60 percent of a naphthene base lubricating oil having an SUS viscosity of about 310 at 100° F. and a boiling range of 619 to 878° F. is made up in the slurry mixer. 800 pounds per hour of this slurry are pumped through a series of 5 heaters such as disclosed in Example 1 where it is heated to about 810° F. and the water of the silica gel and most of the oil content of the slurry are vaporized. The resulting dispersion attains a velocity in excess of 1000 feet per second in passing through the nozzle arrangement as described in Example 1. The dispersion then passes to the cooler 40 as seen in the accompanying figure wherein the oil is allowed to condense by cooling the vapors to a temperature of 400° F., while the water vapor from the silica gel remains in the vaporous condition and passes out of the cooler by means of conduit 42. The resulting liquid grease containing silicone-coated ultra fine particles of silica is then passed into the hopper 46 wherein the grease is agitated to cause entrapped water vapor to separate and pass out through conduit 50.

*Example 4*

A slurry comprising 20 percent solid dehydrated silica, about 1 percent dimethyl silicone, basis dry weight of the solid and 80 percent of a naphthalene base lubricating oil is prepared in a slurry mixer tank. This composition is continuously passed at a rate of 1100 pounds per hour through a series of heaters as described in Example 1 wherein it is heated to 750° F. and there is formed a dispersion of solid silica and silicone in vaporous oil. This vaporous dispersion is then passed to a nozzle arrangement as described in Example 2 wherein the solid silica particles are greatly decreased in size. From this point in the system, the vaporous dispersion, having fine silicone-coated silica particles dispersed therein, is passed to the cooler 40 as shown in the accompanying figure, wherein the dispersion is cooled to 250° F. causing the oil component to liquefy with the entrapment of the fine silicone-coated silica particles. The hot liquid is thereupon recovered from the cooler as a grease having finely-divided silicone-coated silica particles incorporated therein as a gelling agent. This grease displays excellent water resistance in the dynamic water resistance test.

*Example 5*

To approximately 65 parts of mineral lubricating oil, about 35 parts of relatively coarse bentonite clay of about 200 mesh is added, along with about 0.75 percent silicone based on the dry weight of the solid. This mixture, after having the solid thoroughly dispersed in the slurry mixer, is pumped through a series of heaters as described in Example 1 and reaches a temperature of 730° F. whereupon the oil component is partially vaporized creating a vaporous dispersion of thoroughly dispersed bentonite and silicone in oil vapor. This dispersion is then collected in cooler 46 as shown in the accompanying figure wherein heat exchange relationship with a cooler fluid, the vaporous oily constituent is condensed to a liquid thereupon forming a hot grease having finely-divided bentonite coated with a silicone thoroughly dispersed therein. This resulting grease has excellent water resistance.

A further and more complete disclosure of the slurry grinding procedure per se can be seen by examination of the previously identified application Serial No. 400,266.

Obviously, many modifications and variations of the invention, as hereinbefore set forth, may be made without departing from the spirit and scope thereof, and, therefore, only such limitations should be imposed as are indicated in the appended claims.

I claim:

1. A method for preparing a water resistant grease which comprises forming a fluid mixture consisting essentially of a grease gelling amount of coarse silica particles capable of dispersion in vaporized oil, from 0.5 to 5 percent by weight, based on the dry weight of said silica particles, of a liquid silicone having the following general formula:

$$R-\left[\begin{matrix} R \\ | \\ Si-O \\ | \\ R \end{matrix}\right]_n-\begin{matrix} R \\ | \\ Si-R \\ | \\ R \end{matrix}$$

wherein R is an organic radical selected from the group consisting of alkyl, aryl, alkaryl and aralkyl radicals, and *n* is at least 1, and a mineral lubricating oil in an amount sufficient to hold said silica dispersed therein when said oil is vaporized, heating said fluid mixture to form a vapor having said silica dispersed therein, passing said dispersion as a flowing stream continuously at high velocity in turbulent flow through a tubular zone with the result that said coarse silica is converted to silicone-coated, finely-divided silica, removing any aqueous vapor present, cooling said dispersion to condense said oil vapors, and recovering a water-resistant grease.

2. A method for preparing a water resistant grease as set forth in claim 1 wherein said silica is silica gel.

3. A method for preparing hydrophobic, finely-divided silica which comprises forming a fluid mixture consisting essentially of coarse silica capable of dispersion in water vapor, from 0.5 to 5 percent by weight, based on the dry weight of said silica, of a liquid silicone having the following general formula:

$$R-\left[\begin{matrix} R \\ | \\ Si-O \\ | \\ R \end{matrix}\right]_n-\begin{matrix} R \\ | \\ Si-R \\ | \\ R \end{matrix}$$

wherein R is an organic radical selected from the group consisting of alkyl, aryl, alkaryl and aralkyl radicals and *n* is at least 1, and water in an amount sufficient to hold said silica dispersed therein when vaporized, heating said fluid mixture in a long tubular zone to form a vapor having said silica dispersed therein, passing said dispersion as a flowing stream through the tubular zone at high velocity in turbulent flow, separating said water vapor from said silica, cooling, and recovering a silicone-coated material in extremely finely-divided state.

4. A method as described in claim 3 wherein said silica is silica gel.

References Cited in the file of this patent

UNITED STATES PATENTS

| | | |
|---|---|---|
| 1,817,958 | Zwilgmeyer | Aug. 11, 1931 |
| 2,021,143 | Calcott | Nov. 19, 1935 |
| 2,086,997 | Stubner | July 13, 1937 |
| 2,127,026 | Grindrod | Aug. 16, 1938 |
| 2,260,625 | Kistler | Oct. 28, 1941 |
| 2,428,608 | Bass | Oct. 7, 1947 |
| 2,567,315 | Bidaud et al. | Sept. 11, 1951 |
| 2,583,606 | Sirianni et al. | Jan. 29, 1952 |
| 2,595,465 | Keene et al. | May 6, 1952 |
| 2,645,588 | Barry | July 14, 1952 |
| 2,660,564 | Davis | Nov. 24, 1953 |
| 2,668,789 | Phreaner | Feb. 9, 1954 |
| 2,677,658 | Bidaud | May 4, 1954 |